United States Patent

Koziar

[15] 3,658,110

[45] Apr. 25, 1972

[54] TIRE MOUNTING AND INFLATION DEVICE

[72] Inventor: Joseph Koziar, Warrensville Heights, Ohio
[73] Assignee: General Motors Corporation, Detroit, Mich.
[22] Filed: Oct. 16, 1970
[21] Appl. No.: 81,254

[52] U.S. Cl............................................157/1.21, 157/1.33
[51] Int. Cl..........................................................B60c 25/12
[58] Field of Search ........................157/1.2, 1.21, 1.26, 1.33

[56] References Cited

UNITED STATES PATENTS 2,712,850  7/1955  Rerick ..................................157/1.21
3,039,518  6/1962  Neilsen ................................157/1.21

*Primary Examiner*—Granville Y. Custer, Jr.
*Attorney*—J. L. Carpenter and E. J. Biskup

[57] ABSTRACT

A tire mounting and inflation device having provisions for supporting a rim in a fixed position and having a plurality of power-operated contact surfaces for selectively engaging the side wall and the tread portion of the tire so as to facilitate mounting of the tire on the rim and inflation of the tire.

7 Claims, 5 Drawing Figures

INVENTOR.
Joseph Koziar
BY
E. J. Bishup
ATTORNEY

INVENTOR.
Joseph Koziar

BY
E. J. Biskup
ATTORNEY

TIRE MOUNTING AND INFLATION DEVICE

Due to the size of the tires used with off-highway vehicles, special equipment and careful handling are required during the installation of the tire onto the rim and also when demounting or mounting a tire and rim assembly on the vehicle. The present invention is directed to one form of this special equipment which is intended to facilitate the mounting of the tire onto the rim and permit inflation of the tire with a minimum amount of effort on the part of the assemblers. In this regard, the tire mounting and inflation device made according to the invention is intended to be utilized for purposes of installing large diameter off-highway type tires onto a rim which has removable end flange members and lock rings. In the preferred form, this device includes a platform provided with support means for holding the rim in place with its rotational axis located in a vertical position. At least two power-operated tire contact mechanisms are located adjacent the support means at points diametrically opposed to each other. Each of the contact mechanisms includes a carrier which is adjustable supported by the platform so as to permit the device to accommodate tires of varying sizes. The powered portion of the tire contact mechanism consists of a pair of fluid operated cylinders which are mounted on each carrier and are operatively connected to a pair of contact members, one of which is adapted to engage and move one of the side walls of the tires toward the other side wall so as to allow a flange member and lock ring to be mounted on the rim for retaining the tire thereon. The other contact member is adapted to engage and move the tread portion of the tire toward the rim so as to cause the bead of the tire to seal against the flange members and permit compressed air to be delivered to the interior of the tire for inflating the latter.

The objects of the present invention are to provide a tire mounting and inflation device capable of handling tires of varying sizes and requiring a minimum of effort on the part of the assembler during the installation of the tire onto the rim; to provide a tire mounting and inflation device having power-operated contact members adapted to selectively engage the side wall and the tread portion of a tire for facilitating the mounting of the tire onto a rim and the inflation of the tire; to provide a fixture capable of supporting tire rims of varying sizes and having fluid-operated cylinders connected to contact members adapted to selectively engage the side wall and the tread portion of a tire so as to facilitate the assembly of the tire to a rim; and to provide a fixture for mounting and inflating a large diameter tire that includes power-operated contact members adapted to engage the side wall and tread portion of the tire during the assembly of the tire to a rim and being adjustable in a radial direction so as to permit the device to be utilized with tires of varying sizes.

Other objects, advantages and features of the present invention will be apparent from the following detailed description when taken with the drawings in which.

Figure 1:
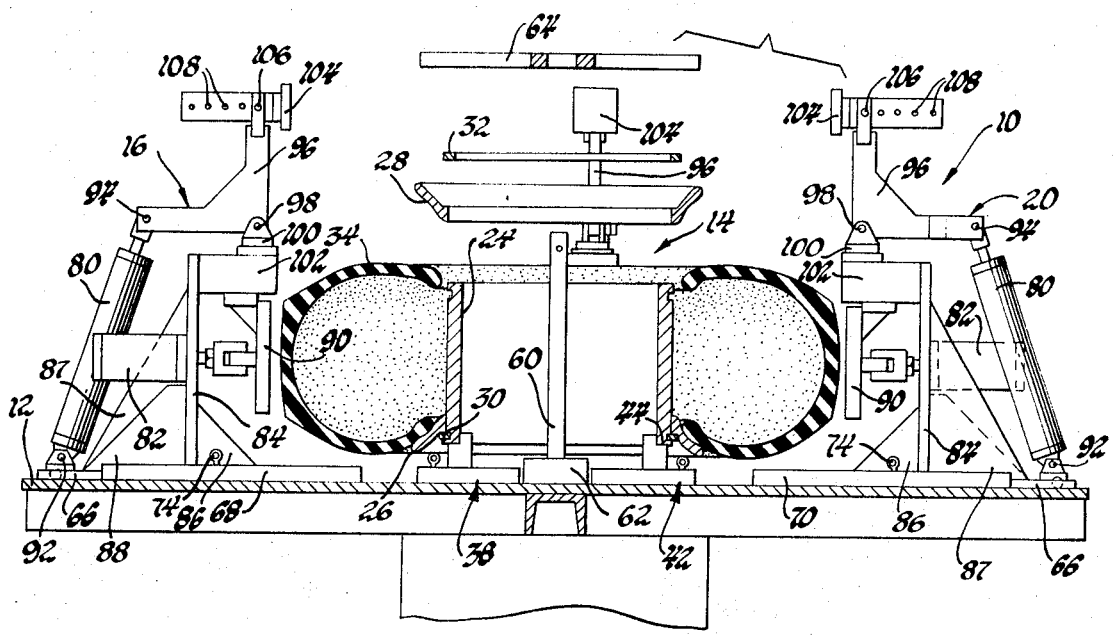
FIG. 1 is an elevational view showing a tire mounting and inflation device made according to the invention and having a tire and rim assembly supported thereby.
Figure 3:
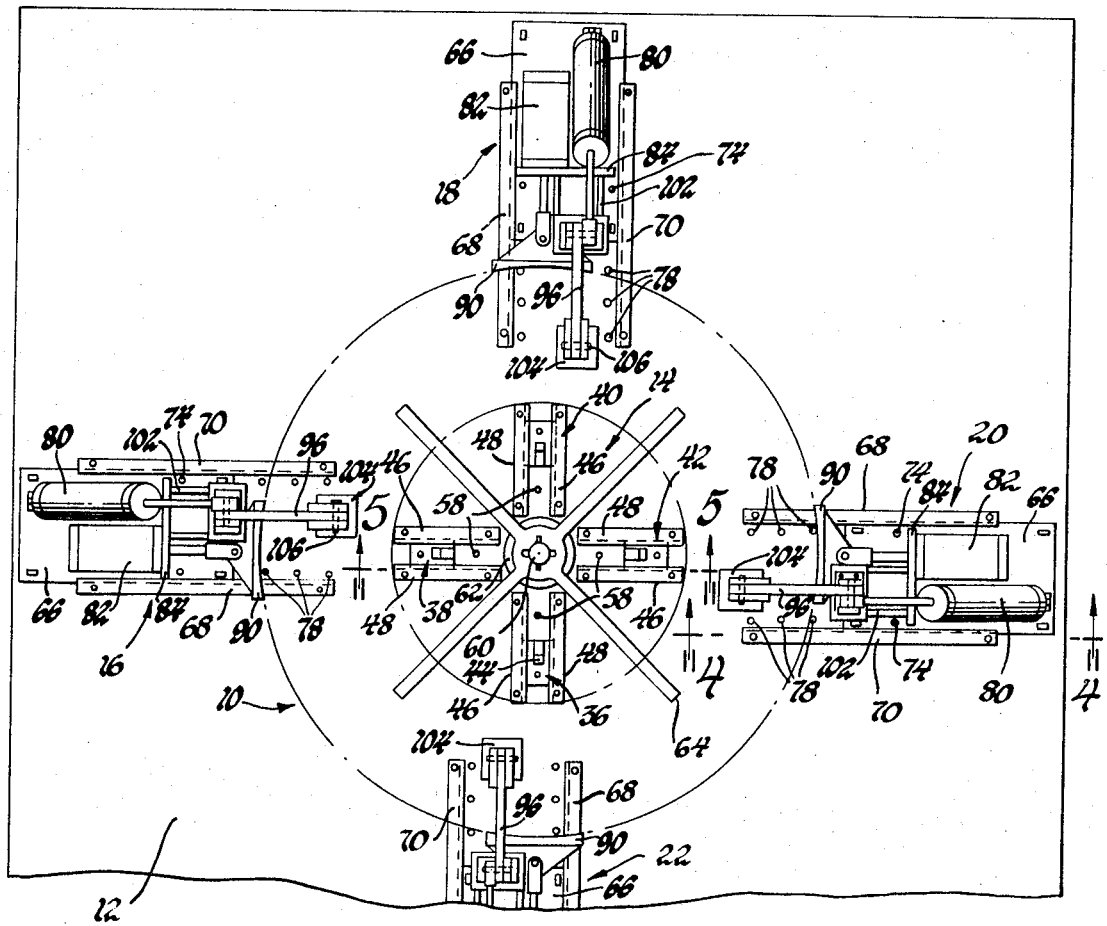
FIG. 3 is a plan view of the device taken on line 3—3 of FIG. 2.

Referring to the drawings and particularly FIGS. 1 and 3 thereof, a tire mounting and inflation device 10 made according to the invention is shown comprising a flat horizontal platform 12 supporting a centrally located rim retaining assembly 14. Four tire contact mechanisms 16, 18, 20 and 22 are mounted on the platform 12 and are equally circumferentially spaced about the center of the rim retaining assembly 14. As aforementioned, the tire mounting and inflation device 10 is intended to be utilized for assembling the tires to the rims of large off-highway vehicles. In this regard, a typical off-highway vehicle tire and rim assembly is shown supported by the device. The tire and rim assembly comprises a rim 24 having removable inner and outer end flange members 26 and 28, respectively, and lock rings 30 and 32. As seen in FIG. 1, the lock ring 30 and end flange member 26 are installed on the rim 24 together with a tire 34 preparatory to the installation of the lock ring 32 and end flange member 28. As should be apparent, inasmuch as the tire 34 and rim 24 are used with an off-highway vehicle, they are of tremendous size and weight and, accordingly, such parts cannot be manually handled but require special hoist equipment to lift and locate the parts onto the device 10. Moreover, once the tire 34 is located on the rim 24 in contact with the end flange member 26, the lock ring 32 and end flange member 28 must be installed and in most instances this requires the upper side wall of the tire 34 to be depressed so as to move the upper bead portion of the tire downwardly to permit such installation. Also, once the end flange members and lock rings are assembled to the rim, the upper and lower bead portions must be sealed against the end flange members to permit inflation of the tire. The tire mounting and inflation device 10 is intended to accomplish these operations by use of the power-operated tire contact mechanisms 16, 18, 20 and 22 in a manner to be described hereinafter.

Figure 5:
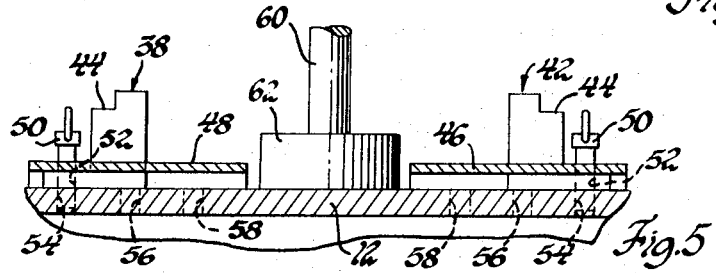
FIG. 5 is an enlarged sectional view taken on line 5—5 of FIG. 3.

The rim retaining assembly 14 comprises four block members 36, 38, 40 and 42, each of which has a notched portion 44 as seen in FIG. 5 for retaining a portion of the inner surface of one side of the rim 24. Each block member is slidably mounted within a pair of parallel and laterally spaced channel members 46 and 48 rigidly secured to the platform 12. A lock pin 50 is slidably retained within a bore 52 formed in the block member and can be positioned in one of a plurality of bores 54, 56 and 58 formed in the platform 12 so as to lock the block member in position. Thus, each block member 36, 38, 40 and 42 can be moved radially to appropriate positions to accommodate rims of varying sizes. The rim retaining assembly 14 is also provided with an upstanding rod 60, the lower end of which is integrally formed with a base member 62 rigidly secured to the platform. As seen in FIG. 1, the rod 60 serves as a support for an X-shaped securement device 64 which is intended to lock the rim 24 onto the block members and more importantly prevent the lock ring 32 and the end flange member 28 from being ejected during inflation of the tire.

Figure 4:
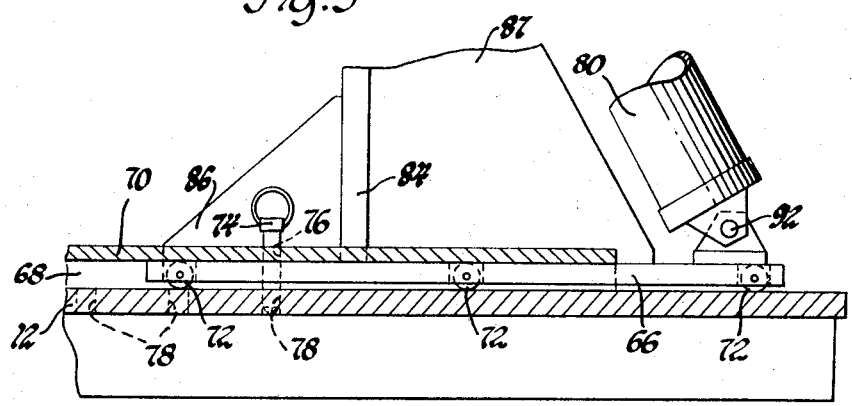
FIG. 4 is an enlarged sectional view taken on line 4—4 of FIG. 3.

Each of the tire contact mechanisms 16, 18, 20 and 22 is identically formed and includes a carrier consisting of a flat rectangular base plate 66 slidably retained between parallel and laterally spaced channel members 68 and 70. Each of the channel members 68 and 70 is rigidly secured to the platform 12 and permits the carrier to be slidably adjusted in a radial direction relative to the rim retaining assembly 14. In this regard, it will be noted as seen in FIGS. 3 and 4, the base plate 66 is provided with two rows of axially spaced rollers 72 and also a pair of lock pins 74, each of which extends through an opening 76 formed in the base plate 66. Each lock pin 74 is adapted to be moved within one of a plurality of equally and axially spaced apertures 78 located in spaced rows and formed in the platform 12 for positioning the tire contact mechanism relative to the rim retaining assembly 14. Accordingly, as in the case with the rim retaining assembly 14, adjustability is provided so as to permit tires and rims of varying sizes to be assembled by this invention.

Each tire contact mechanism 16, 18, 20 and 22 also includes a pair of air operated cylinders 80 and 82 which are incorporated in an air circuit including a source of compressed air and valving for selectively controlling the expansion and contraction of the cylinders. As seen in FIG. 1, the air cylinder 82 is mounted on a stanchion 84 which has the lower edge thereof rigidly supported by the base plate 66 and buttressed in position by triangular members 86, 87 and 88. The air cylinder 82 includes the usual piston rod, the outer end of which supports a flat contact member 90 for pivotal movement about a vertical axis and for axial movement during expansion and contraction of the cylinder. The air cylinder 80 is located in a generally upright position and has the lower end thereof connected by a pivotal connection 92 to the outer end of the base plate 66. The piston rod end of the air cylinder 80 is connected by a pivotal connection 94 to an L-shaped lever 96 which in turn is connected by a pivotal connection 98 to a bracket 100 supported by an outwardly projecting flange 102 rigidly secured to the stanchion 84. The lever 96 supports a flat contact member 104 through a pivotal connection 106. It will be noted that the contact member 104 has a plurality of openings 108 formed therein so as to permit the contact member to be adjusted in a position relative to the lever.

Figure 2:
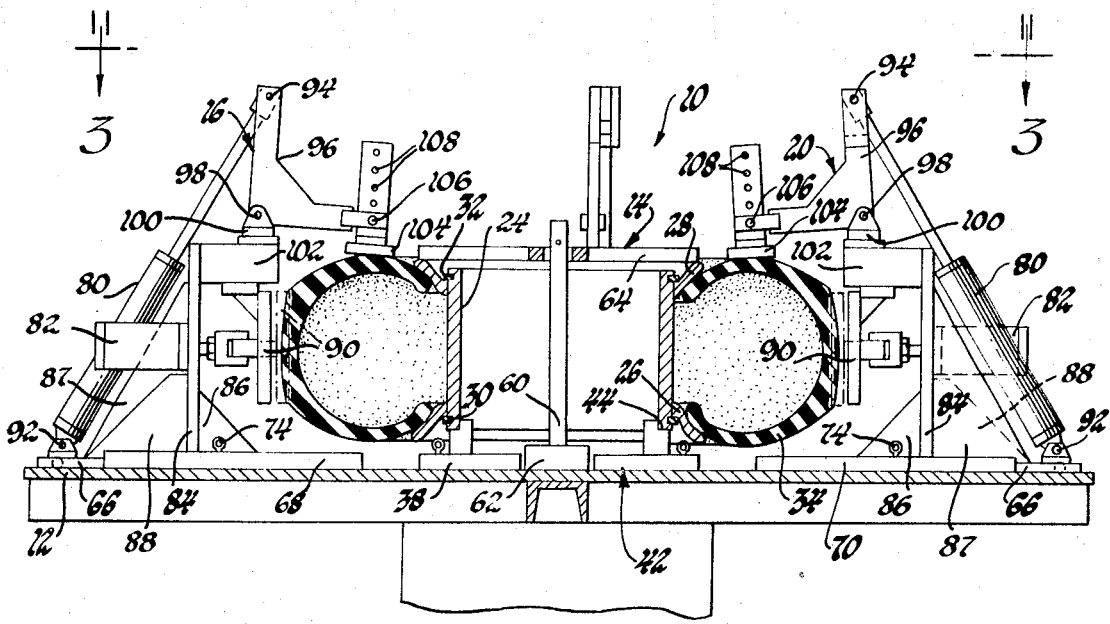
FIG. 2 is a view similar to FIG. 1 and shows the tire contact mechanism incorporated with the device located in a position for facilitating installation of a flange and lock ring to the rim.

When utilizing the tire mounting and inflation device 10, the block members 36, 38, 40 and 42 and tire contact mechanisms 16, 18, 20 and 22 are first properly positioned relative to the platform 12 so as to accommodate the particular tire and rim such as tire 34 and the rim 24. Thereafter, the rim 24 is located in the notched portions 44 of the block members. The inner lock ring 30 and end flange member 26 can then be installed followed by a positioning of the tire 34 onto the rim 24 as seen in FIG. 1. As alluded to hereinbefore, in many cases the upper bead portion of the tire 34 will be located above the rim and will require movement toward the lower bead portion in order to have the outer end flange 28 and lock ring 32 installed onto the rim. With the present invention, this can be accomplished by simultaneously energizing the air cylinder 80 of each of the tire contact mechanisms so that the air cylinder 80 is expanded and causes the lever 96 to pivot with the contact member 104 engaging the upper side wall of the tire 34 and moving it toward the lower side wall as seen in FIG. 2. This is followed by installation of the outer end flange 28 and lock ring 32 after which the air cylinders 80 are contracted so as to return the contact members 104 to the position of FIG. 1. The securement device 64 is then placed on the rod 60 and the tire 34 is then ready for inflation.

During inflation and as aforementioned, it is important to have the bead portions of the tires 34 sealingly seat against the end rim flanges 26 and 28 and this is realized by actuating air cylinders 82 of each of the tire contact mechanisms so as to cause the air cylinder 82 to expand and have the contact member 90 thereof engage the tread portion of the tire, as seen in phantom lines in FIG. 2, and move the tread portion toward the rim 24. Compressed air is then introduced into the tire through the valve stem and the tire 34 is inflated. Once the tire 34 is inflated, air cylinders 82 are contracted, the securement device 64 removed, and the assembled tire and rim raised by an appropriate hoist from the tire mounting and inflation device 10.

Various changes and modifications can be made in this construction without departing from the spirit of the invention. Such changes and modifications are contemplated by the inventor and he does not wish to be limited except by the scope of the appended claims.

I claim:

1. A tire mounting and inflation device for a rim having removable end flange members and lock rings, said device comprising a platform having support means for holding the rim in a fixed position, at least two tire contact mechanisms supported by said platform and located at diametrically opposed points relative to said support means, each of said tire contact mechanisms being mounted on a carrier which is adjustably supported by the platform so as to permit the device to accommodate tires of varying sizes, first and second power-operated extensible members mounted on each carrier, a first tire contact member supported by said carrier and actuated by the first power-operated extensible member for engaging and moving one of the side walls of the tire toward the other side wall to allow a flange member and lock ring to be mounted on said rim for retaining the tire thereon, and a second contact member supported by said carrier and actuated by the second power-operated extensible member for engaging and moving the tread surface of the tire toward the rim so as to cause the tire to seal against the flange members and permit compressed air to be delivered to the interior of the tire for inflating the latter.

2. The tire mounting and inflation device of claim 1 wherein said carrier rigidly supports a stanchion, a lever having an intermediate portion thereof pivotally connected to said stanchion, means pivotally connecting one end of said lever to said first power-operated extensible member, and means pivotally connecting the other end of said lever to said first tire contact member.

3. The tire mounting and inflation device of claim 1 wherein said carrier is formed as a rectangular base plate and is slidably retained between a pair of parallel and laterally spaced channel members.

4. The tire mounting and inflation device of claim 3 wherein a lock pin extends through said base plate into an aperture formed in the platform for locking the tire contact mechanism in an adjusted position.

5. The tire mounting and inflation device of claim 4 wherein said support means include a plurality of block members adjustably supported by said platform for retaining rims of varying sizes.

6. The tire mounting and inflation device of claim 5 wherein each of said block members is slidably retained between a pair of parallel and laterally spaced channel members.

7. A tire mounting and inflation device for a rim having removable end flange members and lock rings, said device comprising a flat horizontal platform having a centrally located support means for holding the rim in a fixed position with the rotational axis of the rim located in a vertical position, at least two tire contact mechanisms located at diametrically opposed points relative to said support means, each of said tire contact mechanisms being mounted on a carrier, means including a plurality of rollers adjustably supporting the carrier on the platform for movement in a radial direction relative to the support means so as to permit the device to accommodate tires of varying sizes, first and second fluid operated cylinders mounted on each carrier, a first tire contact member pivotally supported by said carrier and actuated by the first fluid operated cylinder for engaging and moving one of the side walls of the tire toward the other side wall to allow a flange member and lock ring to be mounted on the upper portion of said rim for retaining the tire thereon, and a second contact member supported for axial movement by said carrier and actuated by the second fluid operated cylinder for engaging and moving the tread surface of the tire toward the rim so as to cause the tire to seal against the flange members and permit compressed air to be delivered to the interior of the tire for inflating the latter.

* * * * *